United States Patent [19]

Levy

[11] Patent Number: 4,742,251
[45] Date of Patent: May 3, 1988

[54] PRECISE CALL PROGRESS DETECTOR

[75] Inventor: Stephen D. Levy, Nevada City, Calif.

[73] Assignee: Silicon Systems, Inc., Tustin, Calif.

[21] Appl. No.: 764,934

[22] Filed: Aug. 12, 1985

[51] Int. Cl.[4] .......................................... H03K 5/153
[52] U.S. Cl. ................................... 307/358; 307/265; 307/351; 328/165
[58] Field of Search .............. 307/350, 358, 265, 351; 328/116, 165

[56] References Cited

U.S. PATENT DOCUMENTS 3,737,790  6/1973  Brown ................................. 328/165
3,968,447  7/1976  Baylac et al. ....................... 307/358
4,122,397 10/1978  Thomas ............................... 307/358

Primary Examiner—John Zazworsky
Attorney, Agent, or Firm—Blakely, Sokoloff, Taylor & Zafman

[57] ABSTRACT

A circuit for providing a dynamic noise floor level. An analog to digital converter provides one of a plurality of outputs as determined by the level of an input signal. A comparator compares each digital input signal with the signal latched in a storage device. For an increasing digital signal the value is latched in a storage device. If the signal is decreasing, the value stored in the storage device is decremented by 1. The output of the storage device is coupled to a demultiplexor for digital to analog conversion. The outputs of the demultiplexor are coupled to a plurality of capacitors of varying capacitance so that a range of output signals may be achieved. The analog output of the circuit is used as a noise floor level in a precise call progress detector.

15 Claims, 4 Drawing Sheets

PRECISE CALL PROGRESS DETECTOR

BACKGROUND OF THE INVENTION

1. Field of the Invention

This invention relates to the field of precise call progress detectors and more specifically to providing a means for determining the duration of input tone bursts.

2. Prior Art

In the prior art, call progress detection has been accomplished by several methods. In one method, an analog input signal is fed through a frequency discriminator (for filtering out noise). The output of the frequency discriminator is coupled to a peak to peak detector coupled to a digital timer for determining the duration of the desired pulse.

A second method provides two part discrimination of the input signal by utilizing an amplitude discriminator and a frequency discriminator. This method also uses a predetermined noise floor to set a low level detect threshold. One drawback of these methods is that the amplitude discrimination filter introduces a gradual decrease in the amplitude of the tone burst at the output of the filter, (called "ringing") at levels within the dynamic range of the detector system. As a result of this gradual decrease in output amplitude the signal level into the level detection circuit is kept above the predetermined noise floor for a duration exceeding the input tone burst duration, which causes inaccuracies in the detection time signal output of the detector. For many telephone applications, the minimum duration of pulse which this prior art system could detect is approximately 500 milliseconds. However, intelligent switching systems require that tone bursts as short as 40 milliseconds be detectable.

SUMMARY OF THE PRESENT INVENTION

The present invention provides a precise call progress detector that incorporates a novel means for supplying a dynamic noise floor level to a zero crossing detector (ZCD) such that ringing effects are eliminated from the detection output signal.

An input tone burst signal is inputted to the ZCD and compared to a noise floor level. If the amplitude of the input signal exceeds the noise floor level, the ZCD provides an in-band output. When the amplitude of the input falls below the noise floor, the in-band output of the ZCD terminates. In the present invention, the input signal is also inputted to a circuit that provides a shifting noise floor level to the ZCD. This circuit compares the input signal to a reference level which is proportional to the current noise floor level. If the input signal exceeds the reference level, the noise floor level increases but remains at least 6 dB below the input signal level. The increased noise floor level is then provided to the zero crossing detector as the new noise floor level.

As a result, when the amplitude of the input signal begins to decrease, it will fall below the current noise floor level signal. Thus, the gradual decrease in amplitude of the input signal caused by the ringing effect will not be registered as part of the input burst. As the amplitude of the input signal level falls, the noise floor level is correspondingly decreased, (after an appropriate delay) such that input signals above a minimum floor level may be detected.

It is therefore an object of the present invention to provide a precise call progress detector that enables accurate determination of the duration of input tone bursts.

It is a further object of the present invention to provide a means of filtering out ringing effects from a call progress filter.

DETAILED DESCRIPTION OF THE PRESENT INVENTION

A precise call progress detector that provides for accurate determination of input tone burst duration is described. In the following description, numerous specific details are set forth, such as signal level, frequency, etc. to provide a more thorough understanding of the present invention. It will be obvious, however, to one skilled in the art, that the present invention may be practiced without these specific details. In other instances, well-known circuits have not been shown in detail so as not to obscure the present invention unnecessarily.

Figure 1:
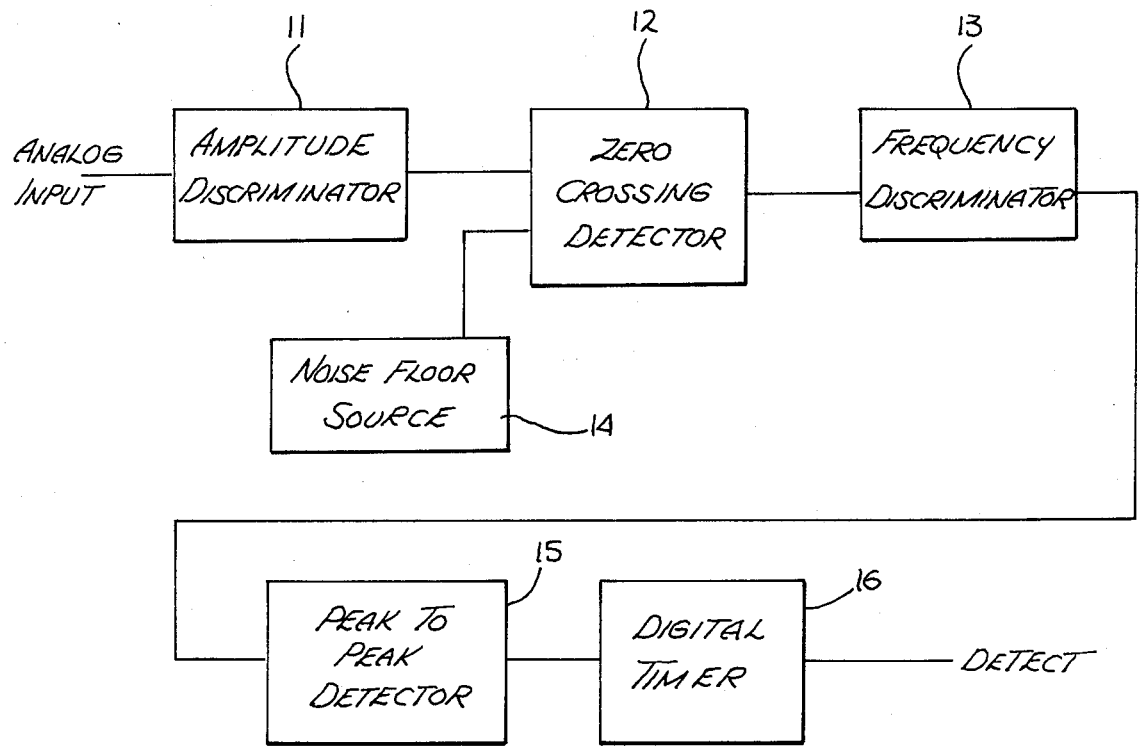
FIG. 1 is a block diagram of a prior art call progress detector.

A typical prior art call progress detector is illustrated in FIG. 1. The analog signal is input into an amplitude discriminator 11 which reduces the amplitude of out of band signals below a preselected level. The output of amplitude discriminator 11 is inputted to zero crossing detector (ZCD) 12. The ZCD provides a square wave output with a high output for every other pair of zero crossing points. Also, a noise floor level signal from noise floor source 14 is inputted into the ZCD 12. This input provides a fixed floor below which the ZCD will not have an in-band output. In a typical prior art call detector, the floor is set at −30 dBm. The output of the ZCD 12 is inputted to a frequency discriminator 13 which can be set to detect a plurality of frequencies. The output of discriminator 13 is coupled to peak to peak detector 15 and digital timer 16 which provides a digital output of the duration of the input tone burst.

Figure 2:
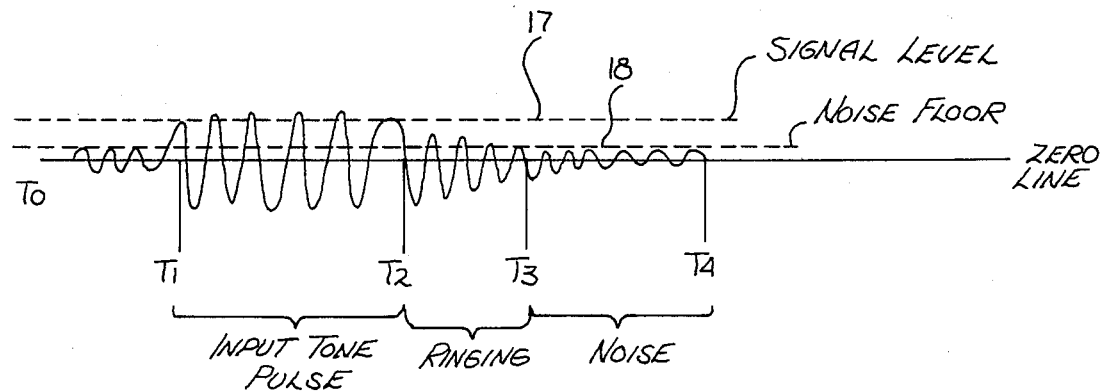
FIG. 2 is a graph of amplitude versus time which illustrates the ringing effect of an input tone pulse.

The operation of the prior art call detector can be seen in FIG. 2. At time T0 the amplitude of the input signal into the amplitude discriminator 11 is zero. However, as shown in FIG. 2, there may be noise on the line. The noise floor 18 is set at a sufficiently high level to prevent detection of this noise.

At time T1, the input tone burst is applied to the input signal line. Because this burst is above the noise floor level, an output is produced at the ZCD 12 of FIG. 1. The true duration of this input tone burst is from T1 to T2. However, because of the undesirable ringing effect occurring from T2 to T3, the ZCD 12 continues to provide an output signal, because the signal on the input line does not fall below the noise floor until time T3. Rather, at time T3, the signal falls below the noise floor and the output of the ZCD will be out of band.

Figure 3:
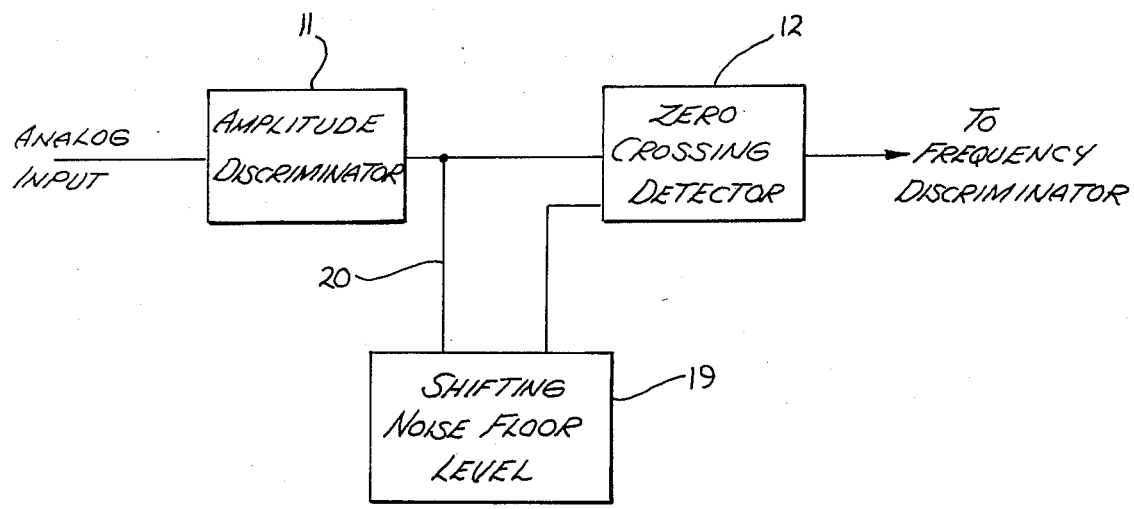
FIG. 3 is a block diagram illustrating the precise call progress detector of the present invention.

The call progress detector of the present invention provides a solution to the problem of ringing. As shown in FIG. 3, the shifting floor level circuit 19 has, as an input, the output of amplitude discriminator 11 and provides a shifting noise floor to zero crossing detector 12.

Figure 4A:
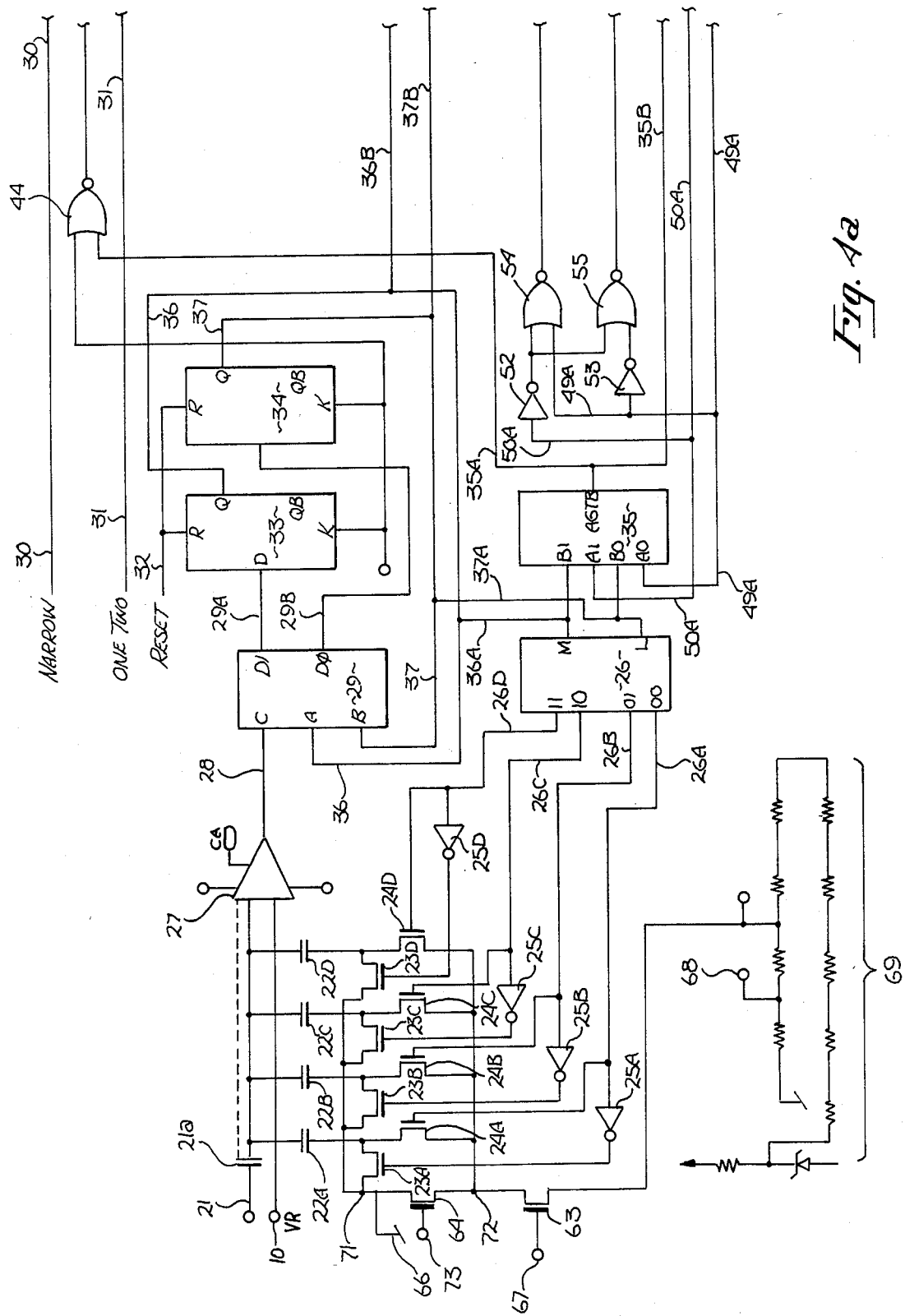
FIGS. 4a and 4b are a schematic diagram which illustrate a preferred embodiment of the present invention.
Figure 4B:
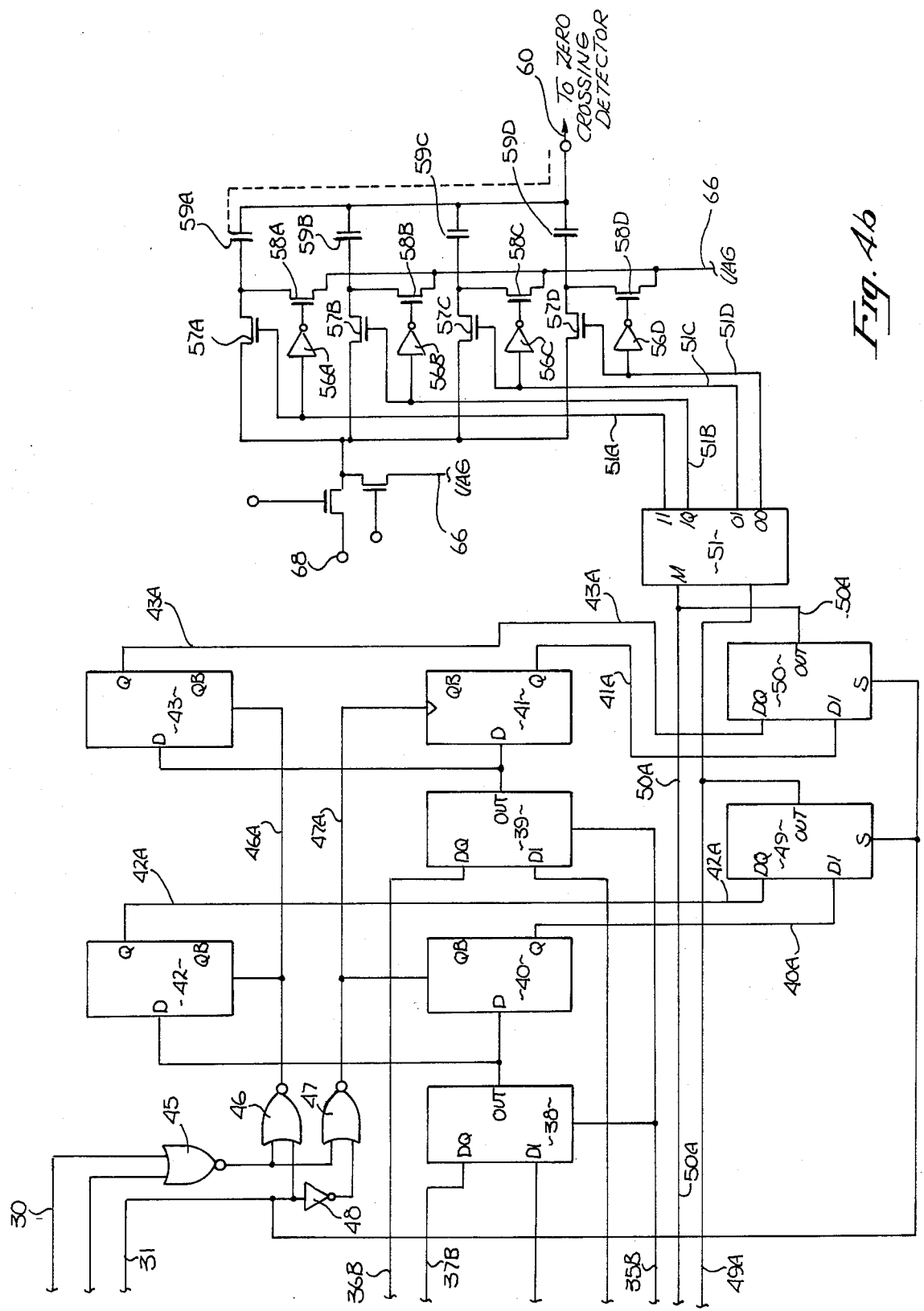

The shifting noise floor level circuit 19 is shown in further detail in FIGS. 4a and 4b. To provide more efficient operation, the circuit as shown provides shifting floor levels to two channels of a call detector scheme. However, it will be appreciated that the present invention will operate effectively on a single channel and to simplify this discussion, the operation of a single channel will be used.

The output signal of the amplitude discriminator is inputted to the circuit on line 21. The signal on line 21, after passing through capacitor 21A, is compared to a voltage reference VR 10 through comparator 27. If the input signal is below the level of the reference voltage, the signal is below the noise floor and the comparator outputs a low signal. If the input signal on line 21 is above the reference voltage VR 10, a high signal output of comparator 27 is coupled on line 28 to the count input of adder 29. When a high signal is received on line 28, the adder 29, which is a two bit adder, increments bits A and B by one and provides outputs on lines 29A and 29B.

Line 29A is coupled to flip-flop 33 while output 29B is coupled to flip-flop 34. These two flip-flops generate a two bit number which is coupled to the comparator circuit. The Q-output 36 of flip-flop 33 is coupled through line 36A to demultiplexor 26. The Q output 37 of flip-flop 34 is also coupled, through line 37A, to demultiplexor 26. When the output of both flip flops is 0, the normal initialization state, output 00 is selected by demultiplexor 26. As will be seen below, flip flops 33 and 34 serve as a storage means to store the digital representation of the current noise floor level.

Line 21, the line on which the input signal is coupled to the comparator, is also coupled to four capacitors 22A through 22D. These capacitors are coupled to a first node 71 through n-channel transistors 23A through 23D respectively. Capacitors 22A through 22D are also coupled to a second node 72 through n-channel transistors 24A through 24D respectively. The gates of transistors 24A through 24D are coupled to outputs 26A through 26D of the demultiplexor 26 respectively. Node 72 is coupled through transistor 63 to resistor string voltage divider 69. The gate of transistor 63 is coupled to a clocking source through line 67. Node 71 is coupled to node 72 through transistor 64. Transistor 64 has its gate coupled to an alternate clocking source 73. The gates of transistors 23A through 23D are coupled through inverters 25A through 25D to lines 26A through 26D of demultiplexor 26 respectively.

When the "zero-zero" output of demultiplexor 26 is selected, (i.e., line 26A) transistor 23A is turned off and transistor 24A is turned on, coupling capacitor 22A to node 72. The remaining outputs of demultiplexor 26, lines 26B through 26D, have low signals, turning off transistors 24B through 24D and turning on transistors 23B through 23D. Therefore, capacitors 22B through 22D are each coupled to voltage VAG through node 71.

VAG is a grounding signal so that those capacitors coupled to VAG are invisible to the signal on line 21. The capacitor coupled to node 72 is coupled through transistor 63 to the resistor string voltage divider 69. The voltage across this capacitor, in this case, capacitor 22A, is added to the voltage signal on line 21. The comparator 27 compares the lower peaks of the sine wave signal on line 21 to the lower peaks of the voltage reference in absolute terms. If, after subtracting the voltage across the selected capacitor from the input signal on line 21, that signal remains greater than the reference voltage, then the input signal level lies somewhere between the level established by the selected capacitor and the capacitor of next higher magnitude. In this manner, ranges of levels of the input signal can be established.

Capacitors 22A through 22D have different values of capacitance. In the preferred embodiment of the present invention, capacitor 22A is at 293.4 fF, capacitor 22B is 585.6 fF, capacitor 22C is 1.17 pF and capacitor 22D is 2.631 pF. Thus, input signal line 21 is selectively coupled to the capacitors 22A through 22D depending on the output of demultiplexor 26. In this manner, a range may be established of the value of the input signal. The capacitors were chosen so that the range of value of the input signal increases logrithmically. Each range is assigned a digital value.

When the input voltage is above the reference voltage, activating adder 29, the output of flip flops 33 and 34 will be 01 so that demultiplexor 26 will select line 26D, establishing a second range for the input signal. The process continues until the input signal falls below the reference level or the highest range is reached.

Adder 29 and flip flops 33 and 34 also convert the analog signal into a two bit digital output. These two bits are also received by adder 29 so that if the input remains above the reference voltage, the adder 29 will increment to the next binary number.

The two bit output is also coupled to a pair of selectors 38 and 39, with output 37 being coupled on line 37 to selector 38 and output 36 being coupled on line 36B to selector 39. The output of selectors 38 and 39 are coupled to flip flops 40 and 41 respectively. This comprises one channel of the call detector.

As mentioned previously, the present invention is multiplexed for more efficient operation. Flip flops 42 and 43, also coupled to selectors 38 and 39, comprise a second channel. The one-two signal on line 31 is applied through NOR Gates 46 and 47 to the clocks of the flip flops of each channel. The state of this signal on line 31 determines which channel will be selected. For purposes of this discussion, it will be assumed that the channel consisting of flip flops 40 and 41 will be selected although it should be appreciated that either channel can be selected. The signal on line 31 is also used to control selectors 49 and 50. The outputs of each channel are received by selectors 49 and 50. Similarly, it will be assumed that selectors 49 and 50 throughput signals received from the channel comprised of flips flops 40 and 41.

Each selector 38 and 39 has two inputs. Selector 38 has as one input the signal on line 37B from flip flop 34. Its second input is received from a subtractor circuit comprised of inverters 52 and 53 and NOR gates 54 and 55. More particularly, the output of NOR gate 54 is coupled to selector 38.

The first input to selector 39 is the signal on line 36B from flip flop 33. The second input is the output of NOR gate 55 received from the subtractor circuit. The select input of selectors 38 and 39 are coupled to the output of comparator 35. Comparator 35 is an A greater than B comparator. The B inputs of comparator 35 consist of the outputs of flip flops 33 and 34. The A inputs of comparator 35 consist of the outputs of flip flops 40 and 41 (acting through selectors 49 and 50).

The A inputs to comparator 35 are the digital representation of the most recent level of the input signal. The B inputs are the digital representation of the current level of the input signal. As long as the input signal is increasing or at a constant level, the A inputs will not exceed the B inputs. Therefore the output of comparator 35 will be low. Thus, the select inputs of selectors 38 and 39 will be low, and therefore select the inputs on lines 37B and 36B respectively. These selected inputs represent the output of flip flops 33 and 34 and are inputted to flip flops 40 and 42.

The output of flip flops 40 and 41 are coupled, through selectors 49 and 50, to demultiplexor 51. Depending upon the digital input to demultiplexor 51, one of the 4 output lines are selected. These output lines are coupled directly to the gates of transistors 57A through 57D respectively and, through inverters 56A through 56D, to the gates of transistors 58A through 58D. When one of the output lines of demultiplexor 51 is selected, for example, line 51A, a high signal on that line turns on transistor 57A and turns off transistor 58A.

For the remaining lines, transistors 57B through 57D are switched off while transistors 58B through 58D are switched on. Thus, capacitor 59A is coupled through transistor 57A to node 68 which is also coupled to resistor string voltage divider 69. The remaining capacitors are coupled to voltage VAG 70 through transistors 58B through 58D and are invisible to output 60.

Finally, the output of shifting noise floor level circuit on line 60 is received by the zero crossing detector to provide the desired noise floor level. Depending upon the digital output of demultiplexor 51, one of capacitors 59A through 59D are selectively coupled to the output line, providing four stages of noise floors to the ZCD 12. The four noise floor levels differ from each other in logrithmic increments, which are dependent upon capacitors 59A through 59D. In the preferred embodiment, capacitor 59A is at 5.26 pF, capacitor 59B is 2.63 pF, capacitor 59C is at 1.315 pF and capacitor 59D is at 292.2 fF.

The comparator 27 compares input signal with the reference signal level. An increasing or constant noise floor level is provided by the present invention as long as the analog input signal exceeds the reference signal level. The flip flops 33 and 34 hold their signals for 8 frames. When the input signal falls below the reference level, the output of adder 29 is no longer inputted to flip flops 33 and 34. Reset signal 32, coupled to the flip flops, resets them to 0. As a result, the outputs of flip flops 33 and 34, coupled to the B inputs of comparator 35, are less than the A inputs representing the last stored digital value. Thus, the A greater than B output of comparator 35 is selected, and the high signal on line 35B causes selectors 38 and 39 to select input from the subtraction circuit. This circuit serves to decrease the most recent output of flip flops 40 and 41 by 1 count.

The output of flip flop 40 is coupled (through selector 49) to one input of NOR gate 54. The output of flip flop 40 is also coupled through inverter 53 to one input of NOR gate 55. The output of flip flop 41 is coupled through inverter 52 to NOR gate 54 and NOR gate 55. As already described, the output of NOR gate 54 is coupled to selector 38 while the output of NOR gate 55 is coupled to selector 39. The high signal on line 35b selects the output from the subtractor circuit so that the value stored into flip flops 40 and 41 is one less than the prior value stored there. When the output of flip flops 40 and 41 is applied to demultiplexor 51, an output line of one digital value less is selected, which results in a lower noise floor level provided to ZCD 12 results.

Simultaneously, the zero outputs of flip flops 33 and 34 are coupled to the inputs of adder 29 and to the inputs of multiplexor 26. If the analog input signal remains below the reference level, selector 35 will select the output of the subtractor circuit to provide to flip flops 40 and 41, decreasing the noise floor level by 1 each time.

Figure 5:
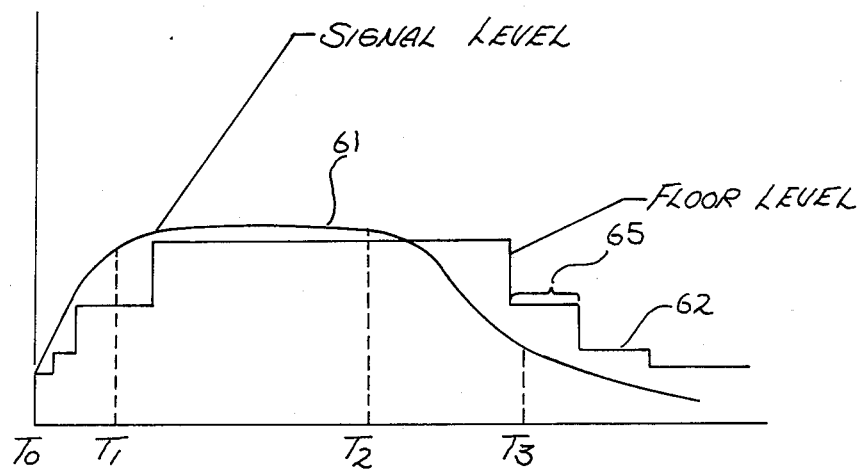
FIG. 5 is a graph showing the input signal level and the noise floor level as a function of time.

The operation of the shifting noise floor circuit can be seen in FIG. 5. The input signal level is shown by line 61 and the floor level by line 62. Between time T0 and T1, the input signal increases logrithmically to the peak level. During this time, the noise floor level increases logrithmically in four stages, always remaining at least 6 dB below the signal level. Between time T2 and T3, the signal, declines gradually due to the ringing effect. During this interval, the noise floor level exceeds the analog input signal level such that the output from the zero crossing detector drops to zero. The noise floor level remains at any particular stage for a duration shown by line segment 65. Each stage is maintained for 8 frames (samplings) so that the noise floor does not fall below the decreasing analog input signal level. Thus, a false output from the zero crossing detector 12 is prevented.

A novel circuit and method for providing a dynamic noise floor level in a precise call progress detector has been shown. The dynamic noise floor level allows identification of pulses of shorter duration than can be identified by prior art call progress detectors.

I claim:

1. A circuit for providing a dynamic noise floor level comprising:
   level indicating means for providing and output signal when an input signal is greater than a reference signal;
   analog to digital converting means for selectively providing one of a plurality of digital outputs selectably determined based on the level of said output signal;
   selector means having a first and second input, said first input of said selector means coupled to said provided digital output of said analog to digital converting means, said selector means having a selected output of one of said first and second inputs;
   storage means coupled to said selector means, said storage means having as output a stored value from said storage means consisting of said selected output of said selector means;
   comparator means coupled to said storage means and to said analog to digital converting means, said comparator means for comparing said stored value with said provided digital output;
   said selected output of said selector means coupled through a subtractor to said second input of said selector means, for decrementing said selected output by one binary digit;
   said comparator means coupled to said selector means such that said selector means selects said second output when said output of said storage means exceeds said provided digital output; and
   a digital to analog converter coupled to said storage means, said digital to analog converter having a plurality of noise floor levels as output, one of said plurality of noise floor levels being selected dependent upon said output of said storage means, whereby a method of providing a dynamic noise floor level is achieved.

2. The circuit as claimed in claim 1, wherein said digital to analog converter selects a noise floor level having a lower value than the previously selected noise floor level when said second input of said selector means is selected by said selector means.

3. The circuit as claimed in claim 1 wherein said storage means comprises a plurality of flip flops.

4. The device as claimed in claim 1 wherein said digital to analog converter comprises a demultiplexor having a plurality of output lines, each of said output lines coupled to one of a plurality of capacitors.

5. A precise call progress detector having a dynamic noise floor source comprising:
   an amplitude discriminator for receiving a first input signal, said amplitude discriminator outputting a second signal;
   a zero crossing detector coupled to said amplitude discriminator for comparing said second signal to a selected noise floor level;
   a noise floor source coupled to said amplitude discriminator and to said zero crossing detector for determining the level of said second signal, wherein one of a plurality of noise floors is selectively provided by said noise floor source to said zero crossing detector selectively determined based upon said level of said second signal; and wherein said zero crossing detector outputs a third signal;
   a frequency discriminator coupled to said zero crossing detector, said frequency discriminator outputting a fourth signal depending on the frequency of said third signal; and
   a peak to peak detector and digital timer coupled to said frequency discriminator for controlling the time duration of said fourth signal.

6. The call progress detector as claimed in claim 5 wherein said noise floor source comprises:
   a first comparing means for comparing said second output signal to a reference signal, said comparing means having a plurality of selected outputs, wherein one of said outputs is selected dependent on the level of said second signal;
   storage means coupled to said first comparing means for storing said selected output of said first comparing means;
   output means coupled to said storage means, said output means providing said plurality of noise of floor levels, one of said noise floor levels being selected by said output means based upon said selected output signal stored in said storage means.

7. The call progress detector as defined by claim 6 wherein said noise floor source further includes:
   a second comparing means coupled to said selected output and to said storage means, said second comparing means for comparing said first comparator signal and the value stored in said storage means;
   subtraction means coupled to said second comparing means and said storage means, said subtraction means for subtracting a subtraction value from said stored value when said stored value is greater than said selected output signal, said output means selecting a noise floor level having a lower value than the previously selected noise floor level when said stored value is greater than said selected output signal.

8. The call progress detector as claimed in claim 7, wherein said first comparing means comprises a comparator coupled to a digital adder.

9. The call progress detector as claimed in claim 8, wherein said storage means comprises a plurality of flip-flops.

10. The call progress detector as claimed in claim 9, wherein said output means comprises a digital demultiplexor.

11. The call progress detector as claimed in claim 10, wherein said subtraction means comprises a plurality of NOR gates coupled to said storage means.

12. A method for providing a dynamic noise floor comprising the steps of:
    comparing an input signal to a reference signal;
    selecting one of a plurality of input level signals selectively determined based on level of said input signal;
    storing said input level signal in a storage means; and
    selecting one of a plurality of noise floor levels determined based on said stored input level signal;
    whereby said noise floor level is determined based on the level of said input signal.

13. The method as claimed in claim 12, further comprising the steps of:
    comparing said input level signal to the signal stored in said storage means, said signal stored in said storage means representing a previous input level signal;
    decreasing said value stored in said storage means by a first amount when said stored value is greater than said input level signal; and
    selecting a different one of said plurality of noise floor levels when said stored value is decreased.

14. A circuit for time containing an input signal consisting of a tone burst superimposed on a background of noise, said circuit comprising:
    amplitude discrimination means coupled to said input signal, said amplitude discrimination means for filtering out input signals having an amplitude outside a desired range of amplitudes, said amplitude discrimination means outputting a filtered signal;
    noise floor generation means coupled to said filtered signal, said noise floor level generation means generating one of a plurality of noise floor level signals, said noise floor level signals being less than the amplitude of said tone burst when said amplitude of said tone burst is increasing or constant, said noise floor level being greater than the amplitude of said tone burst when said amplitude is decreasing;
    detection means coupled to said filtered signal and said noise floor level signal, said detection means outputting a valid signal when said amplitude of said filtered signal exceeds said noise floor level signal;
    whereby said valid signal occurs when said tone burst increases or remains constant in amplitude.

15. The circuit of claim 14 wherein said noise floor level generation means comprises:
    first comparing means coupled to said filter signal, said first comparing means for comparing amplitude of said tone burst to one of a plurality of reference signals, said comparing means outputting a first signal when said amplitude of said tone burst exceeds said reference signal;
    first conversion means coupled to said first signal, said first conversion means for converting said first signal to one of a plurality of said second signals, each of said plurality of said second signals representing a level of said amplitude of said tone burst, each of said second signals being a digital signal;

first selection means coupled to said second signal, said selection means for selecting one of said plurality of said reference signals depending on the digital value of said second signal;

second comparing means coupled to said first conversion means, said second comparing means for comparing a present value of said second signal to a previous value of said second signal, said second comparing means outputting a third signal when said present signal is greater than or equal to said previous second signal and outputting a fourth signal when said present second signal is less than said previous second signal;

second selection means coupled to said second comparing means, said second selection means for selecting one of said plurality of noise level signal outputs when said second comparing means outputs said third signal, said selected output dependent upon the digital value of said present second signal, said second selection means selecting one of said plurality of noise floor level signal outputs dependent upon said previous second signal decremented by a digital value of one when said second comparing means outputs said fourth signal.

* * * * *

UNITED STATES PATENT AND TRADEMARK OFFICE
CERTIFICATE OF CORRECTION

PATENT NO. : 4,742,251

DATED : May 3, 1988

INVENTOR(S) : Levy, et al

It is certified that error appears in the above-identified patent and that said Letters Patent is hereby corrected as shown below:

```
In column 1, line 27, after "amplitude", insert --,--.
In column 4, line 19, and column 6, lines 13 and 15, "logrithmically"
     should read --logarithmically--.
In column 4, line 24, "26D" should read --26B--;
     line 33, "37" (2nd occurrence) should read --37B--.
In column 5, line 15, delete "4", and insert in place thereof --four--;
     line 36, "logrithmic" should read --logarithmic--;
     line 41, after "compares", insert --the--;
     line 45, delete "8", and insert in place thereof --eight--;
     line 64, "35b" should read --35B--;
     line 66, delete "stored", and insert in place thereof --placed--.
In column 6, line 2, delete "results";
     line 8, delete "1", and insert in place thereof --one--.
In column 6, line 35, (claim 1) "providing and output" should read
     --providing an output--.
In column 7, line 34, (claim 5) "depending" should read --dependent--.
          line 50, (claim 6) after "plurality of noise", delete
          "of".
```

Signed and Sealed this

Sixth Day of October, 1992

*Attest:*

DOUGLAS B. COMER

*Attesting Officer*     Acting Commissioner of Patents and Trademarks